US012610188B2

(12) United States Patent
Konno et al.

(10) Patent No.: US 12,610,188 B2
(45) Date of Patent: Apr. 21, 2026

(54) SIGNAL PROCESSING DEVICE AND SIGNAL PROCESSING METHOD

(71) Applicant: Panasonic Intellectual Property Management Co., Ltd., Osaka (JP)

(72) Inventors: Fumiyasu Konno, Osaka (JP); Masahide Onishi, Osaka (JP); Yoshitaka Kawashima, Shiga (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 151 days.

(21) Appl. No.: 18/368,788

(22) Filed: Sep. 15, 2023

(65) Prior Publication Data

US 2024/0107233 A1 Mar. 28, 2024

(30) Foreign Application Priority Data

Sep. 28, 2022 (JP) ................................ 2022-155152

(51) Int. Cl.
*H04R 3/14* (2006.01)
*H04R 1/02* (2006.01)
(Continued)

(52) U.S. Cl.
CPC ............... *H04R 3/14* (2013.01); *H04R 1/025* (2013.01); *H04R 1/26* (2013.01); *H04R 1/2873* (2013.01); *H04R 3/04* (2013.01)

(58) Field of Classification Search
CPC ............. B60W 60/0016; B60W 40/08; B60W 2050/143; B60W 2040/0827;
(Continued)

(56) References Cited

U.S. PATENT DOCUMENTS 4,636,899 A * 1/1987 Yamada ................. G11B 5/488 360/123.17
5,742,688 A * 4/1998 Ogawa ................... G10K 15/02 381/61
(Continued)

FOREIGN PATENT DOCUMENTS

JP 2007-181135 7/2007
JP 2019-125906 A 7/2019
JP 7109135 B1 7/2022

OTHER PUBLICATIONS

Japanese Office Action dated Dec. 23, 2025 issued in Japanese Patent Application No. 2022-155152 along with Englis translation.

*Primary Examiner* — Duc Nguyen
(74) *Attorney, Agent, or Firm* — Greenblum & Bernstein, P.L.C.

(57) ABSTRACT

A signal processing device for reproducing a musical piece from one or more loudspeakers and one or more actuators that are provided in a seat includes: an obtainer that obtains data of the musical piece; and an outputter that outputs an acoustic signal of a first frequency band included in the data of the musical piece to the one or more actuators, and outputs an acoustic signal of a frequency band excluding the first frequency band to the one or more loudspeakers, the frequency band being included in the data of the musical piece. The first frequency band is a band including a resonance frequency of the one or more actuators.

6 Claims, 10 Drawing Sheets

(51) Int. Cl.

| | |
|---|---|
| ***H04R 1/26*** | (2006.01) |
| ***H04R 1/28*** | (2006.01) |
| ***H04R 3/04*** | (2006.01) |

(58) Field of Classification Search

CPC ... B60W 2050/146; G08G 1/16; H04R 5/023; H04R 1/2857; H04R 3/04; H04R 29/00; H04S 7/30

See application file for complete search history.

(56) References Cited

U.S. PATENT DOCUMENTS

| | | | | | |
|---|---|---|---|---|---|
| 5,784,473 | A * | 7/1998 | Ferren | A63J 5/00 | 381/337 |
| 5,889,875 | A * | 3/1999 | Caron | A47C 7/727 | 381/345 |
| 5,920,633 | A * | 7/1999 | Yang | H04R 1/2857 | 381/83 |
| 9,478,203 | B2 * | 10/2016 | Nakata | G10H 1/06 | |
| 10,395,489 | B1 * | 8/2019 | Cruz-Hernandez | G06F 3/016 | |
| 2008/0013430 | A1 * | 1/2008 | Rivas Quesada | G11B 27/034 | 369/59.1 |
| 2015/0063600 | A1 * | 3/2015 | Kono | H03G 9/005 | 381/107 |
| 2015/0123774 | A1 | 5/2015 | Ioffreda et al. | | |
| 2015/0189441 | A1 * | 7/2015 | Oishi | H04R 5/04 | 381/309 |
| 2016/0112744 | A1 * | 4/2016 | Kusano | H04N 21/8113 | 725/81 |
| 2020/0322713 | A1 | 10/2020 | Tomoi | | |
| 2021/0321212 | A1 * | 10/2021 | Li | H04S 7/304 | |
| 2022/0073092 | A1 * | 3/2022 | Yuasa | G08G 1/0133 | |

* cited by examiner

SIGNAL PROCESSING DEVICE AND SIGNAL PROCESSING METHOD

CROSS REFERENCE TO RELATED APPLICATION

The present application is based on and claims priority of Japanese Patent Application No. 2022-155152 filed on Sep. 28, 2022.

FIELD

The present disclosure relates to a signal processing device and a signal processing method.

BACKGROUND

Patent Literature (PTL) 1 describes a system that transmits or attenuates an acoustic signal of a specific frequency.

CITATION LIST

Patent Literature

PTL 1: Japanese Unexamined Patent Application Publication No. 2007-181135

SUMMARY

However, the system disclosed in PTL 1 can be improved upon.

In view of this, the present disclosure provides a signal processing system, and so on, capable of improving upon the above related art.

A signal processing device according to an aspect of the present disclosure is signal processing device for reproducing a musical piece from one or more loudspeakers and one or more actuators that are provided in a seat, and includes: an obtainer that obtains data of the musical piece; and an outputter that outputs an acoustic signal of a first frequency band included in the data of the musical piece to the one or more actuators, and outputs an acoustic signal of a frequency band excluding the first frequency band to the one or more loudspeakers, the frequency band being included in the data of the musical piece, wherein the first frequency band is a band including a resonance frequency of the one or more actuators.

A signal processing method according to an aspect of the present disclosure is a signal processing method for reproducing a musical piece from one or more loudspeakers and one or more actuators that are provided in a seat, and includes: obtaining data of the musical piece; and outputting an acoustic signal of a first frequency band included in the data of the musical piece to the one or more actuators, and outputting an acoustic signal of a frequency band excluding the first frequency band to the one or more loudspeakers, the frequency band being included in the data of the musical piece, wherein the first frequency band is a resonance frequency of the one or more actuators.

A signal processing device, and so on, according to an aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

In recent years, seats in which loudspeakers and actuators are embedded have been developed, and it has become possible to reproduce sound from the loudspeakers and give vibration corresponding to the sound by the actuators to the persons seated on the seats. However, when the system described in PTL 1 is applied to such a seat, uncomfortable vibration may be given to the person seated on the seat depending on the type of sound.

In view of this, hereinafter, a signal processing device that can suppress giving uncomfortable vibration may be given to the person seated on the seat will be described.

Hereinafter, exemplary embodiments will be described with reference to the drawings.

It should be noted that each of the exemplary embodiments described hereinafter shows a general or specific example. Numerical values, shapes, materials, structural components, the arrangement and connection of the structural components, steps, the order of the steps, and so on, are mere examples, and thus are not intended to limit the present disclosure.

Embodiment 1

Hereinafter, a loudspeaker system and a seat in which the loudspeaker system is provided according to Embodiment 1 will be described with reference to the drawings.

Figure 1:
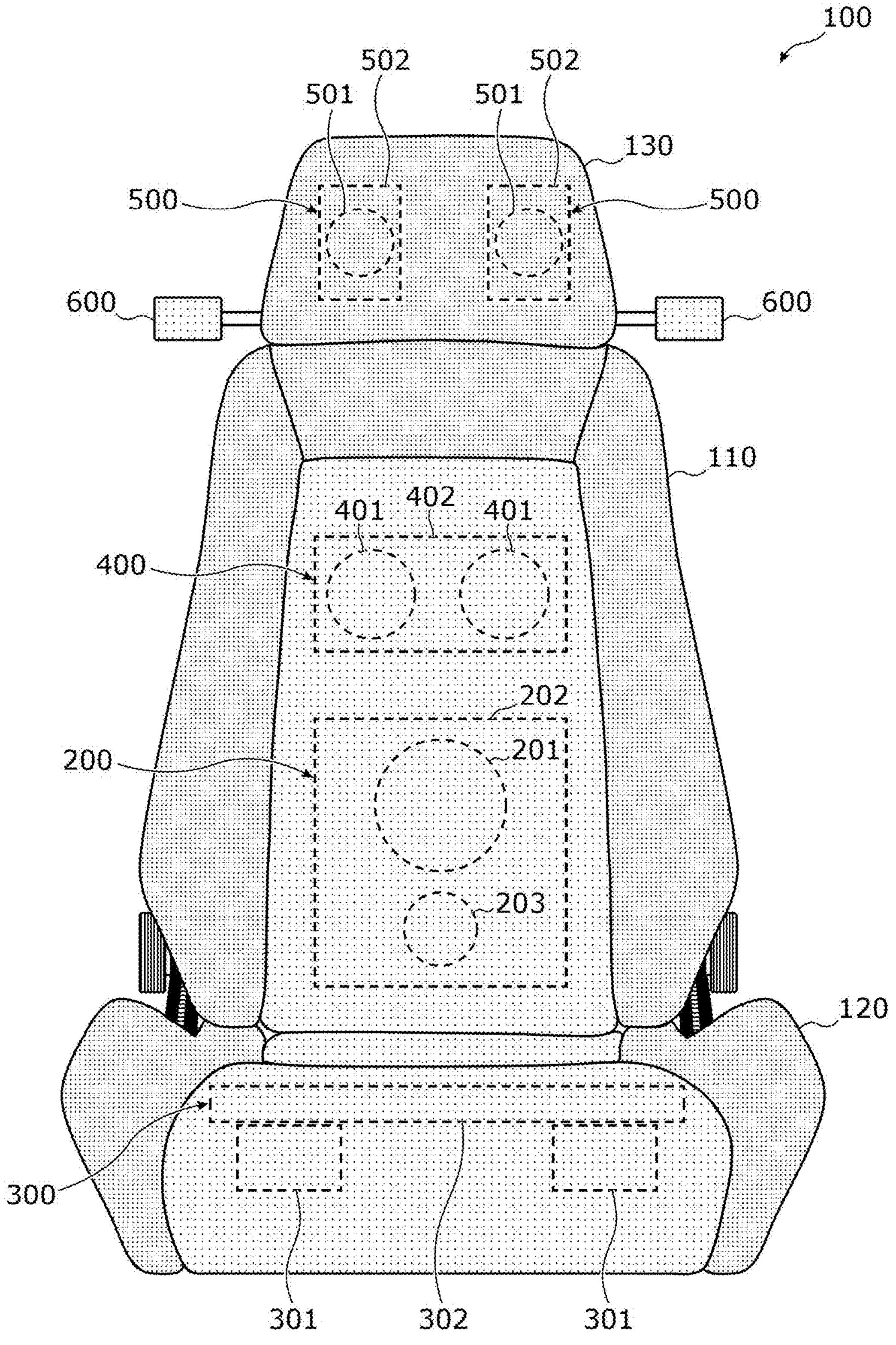
FIG. 1 illustrates a front view of an example of a seat according to Embodiment 1.

FIG. 1 is a front view illustrating an example of seat 100 according to Embodiment 1.

Seat 100 is a seat that is placed in, for example, a moving body such as a vehicle, an aircraft, and a ship. Note that seat 100 is not limited to a seat that is placed in a cabin of the moving body, and may be a seat that is placed in a movie theater, a theater, or a conference room, a chair with a cushion, a legless chair, a sofa, a massage chair or the like.

Seat 100 includes seat back 110, seat surface 120, and headrest 130. Seat back 110 is a part that supports a back of a person and so on when the person is seated on seat 100. Seat surface 120 is a part that supports thighs and so on of a person when the person is seated on seat 100. Headrest 130 is a part that supports a head and so on of a person when the person is seated on seat 100.

Seat 100 is provided with one or more loudspeakers and one or more actuators. The loudspeaker is a device that converts electric signals into sound, and the actuator is a device that converts electric signals into a physical motion (for example, vibration). For example, the one or more actuators include a first actuator that is provided inside seat surface 120 of seat 100 at a position corresponding to thighs of a person in seat surface 120 when the person is seated on seat 100, or a second actuator provided inside seat back 110 of seat 100 at a position corresponding to a sacrum of the person in seat back 110. For example, the one or more loudspeakers include a first loudspeaker that is provided inside seat back 110 of seat 100 at a position corresponding to an abdominal region of the person in seat back 110 when the person is seated on seat 100, a second loudspeaker that is provided inside seat back 110 of seat 100 at a position corresponding to a back of the person in seat back 110, a third loudspeaker that is provided inside headrest 130 of seat 100, or tweeter 600 that is attached to headrest 130.

For example, seat 100 includes loudspeaker systems 200, 400, and 500, actuator system 300, and tweeters 600. For example, the one or more loudspeakers are included in loudspeaker systems 200, 400, and 500, and the one or more actuators are included in loudspeaker system 200 and actuator system 300. For example, loudspeaker systems 200 and 400 are provided inside seat back 110, and actuator system 300 is provided inside seat surface 120, and loudspeaker systems 500 are provided inside headrest 130.

Figure 2A:
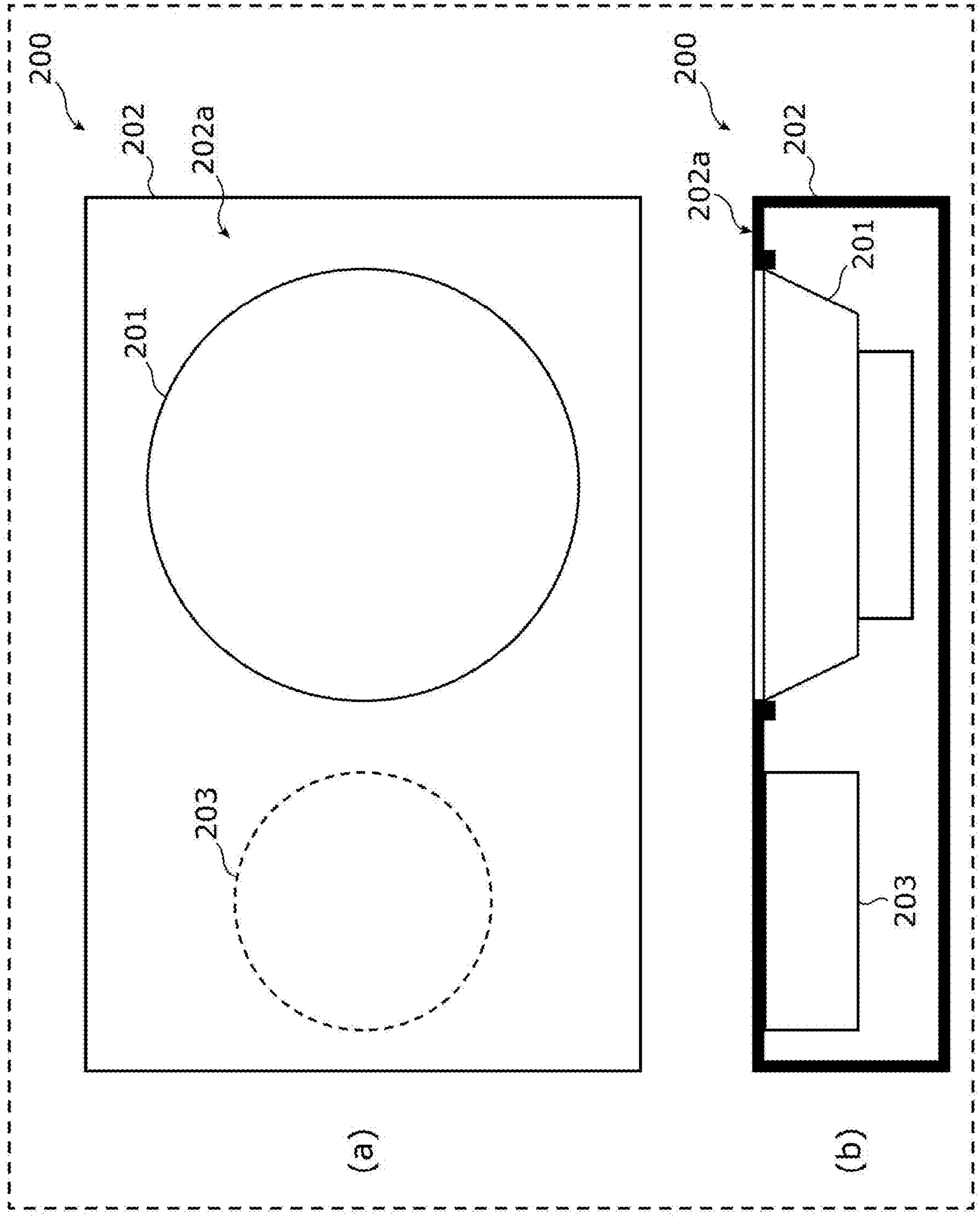
FIG. 2A illustrates a front view and a cross-sectional view of an example of a loudspeaker system according to Embodiment 1.

Loudspeaker system 200 includes loudspeaker 201, loudspeaker box 202 provided with loudspeaker 201, and actuator 203. Actuator 203 is provided in loudspeaker box 202 to cause a baffle panel of loudspeaker box 202 to generate vibration (see FIG. 2A described later).

Loudspeaker box 202 is provided inside seat 100, and, for example, provided inside seat back 110. For example, as illustrated in FIG. 1, loudspeaker box 202 is provided inside seat back 110 of seat 100 at a position that is below a center in seat back 110. Accordingly, it is possible to give powerful vibration by actuator 203 in loudspeaker box 202 to an area around the abdominal region and buttocks of a person seated on seat 100. Furthermore, when heavy bass sound is outputted from loudspeaker 201, it is possible to expose the area around the abdominal region and buttocks of the person seated on seat 100 to a sound wave of heavy bass sound from loudspeaker 201 in loudspeaker box 202, and it is possible to provide powerful sound with vibration. Loudspeaker box 202 is a member in a rectangular parallelepiped shape, for example, and is formed from wood, resin, metal or the like.

Actuator 203 is provided at a position below loudspeaker 201 in seat back 110, for example. Accordingly, it is possible to give powerful vibration by actuator 203 to the area around the buttocks of the person seated on seat 100. Specifically, actuator 203 is provided at a position corresponding to a sacrum of the person in seat back 110 when the person is seated on seat 100, for example. Accordingly, it is possible to give powerful vibration by actuator 203 to the sacrum of the person seated on seat 100. Actuator 203 is an example of the second actuator. Actuator 203 is capable of reproducing sounds from 40 Hz to 90 Hz (in other words, capable of generating low frequency vibration from 40 Hz to 90 Hz), for example. For example, actuator 203 is monaurally driven. Note that a plurality of actuators 203 may be provided in loudspeaker box 202.

Loudspeaker 201 is provided, for example, at a position corresponding to abdominal region of a person in seat back 110 when the person is seated on seat 100. Accordingly, when heavy bass sound is outputted from loudspeaker 201, it is possible to expose the abdominal region of the person seated on seat 100 to a sound wave of heavy bass sound, and it is possible to provide powerful sound with vibration. Loudspeaker 201 is an example of the first loudspeaker. For example, loudspeaker 201 is a woofer, and capable of reproducing sound in a band from 40 Hz to 150 Hz. For example, loudspeaker 201 is monaurally driven. Note that a plurality of loudspeakers 201 may be provided in loudspeaker box 202. Furthermore, a plurality of loudspeaker systems 200 may be provided in seat back 110.

Loudspeaker system 200 can give vibration while exposing the person seated on seat 100 to a sound wave from seat back 110 of seat 100.

Actuator system 300 includes actuator 301 and vibration plate 302.

Actuator 301 is provided at a position corresponding to thighs of a person in seat surface 120 of seat 100 when the person is seated on seat 100. Actuator 301 is an example of the first actuator. Actuator 301 is fixed to vibration plate 302 to cause vibration plate 302 to generate vibration. Vibration plate 302 is provided inside seat surface 120. Vibration plate 302 is, for example, a member in a rectangular plate shape, and is formed from wood, resin, metal or the like. Actuator system 300 can give vibration to the person seated on seat 100 from seat surface 120 of seat 100. Actuator 301 is capable of reproducing sound from 40 Hz to 90 Hz (in other words, capable of generating low frequency vibration from 40 Hz to 90 Hz), for example. For example, actuator 301 is monaurally driven. Note that at vibration plate 302, only one actuator 301 may be provided, or three or more actuators 301 may be provided.

Loudspeaker system 400 includes loudspeakers 401, and loudspeaker box 402 in which loudspeakers 401 are provided.

Loudspeaker box 402 is provided inside seat 100, and is provided inside seat back 110, for example. For example, as illustrated in FIG. 1, loudspeaker box 402 is provided in seat back 110 of seat 100 at a position that is above a center in seat back 110. Loudspeaker box 402 is a member in a rectangular parallelepiped shape, for example, and is formed from wood, resin, metal or the like.

Loudspeaker 401 is provided at a position corresponding to a back of a person in seat back 110 when the person is seated on seat 100, for example. Loudspeaker 401 is an example of the second loudspeaker. For example, loudspeaker 401 is a full-range loudspeaker, and capable of reproducing sound in a band from 150 Hz to 800 Hz. For example, loudspeaker 401 is monaurally driven. Note that in loudspeaker box 402, only one loudspeaker 401 may be provided, or three or more loudspeakers 401 may be provided. Furthermore, a plurality of loudspeaker systems 400 may be provided in seat back 110.

Loudspeaker system 400 can expose the person seated on seat 100 to a sound wave from seat back 110 of seat 100.

Loudspeaker system 500 includes loudspeaker 501 and loudspeaker box 502 in which loudspeaker 501 is provided.

Loudspeaker box 502 is provided inside seat 100, and provided inside headrest 130, for example. Loudspeaker box 502 is a member in a rectangular parallelepiped shape, for example, and is formed from wood, resin, metal or the like.

Loudspeaker 501 is provided at a position corresponding to the head of a person in headrest 130 when the person is seated on seat 100, for example. Loudspeaker 501 is an example of the third loudspeaker. For example, loudspeaker 501 is a full-range loudspeaker, and capable of reproducing sound in a band from 350 Hz to 20 kHz. As illustrated in FIG. 1, for example, two loudspeaker systems 500 are provided in headrest 130, and two loudspeaker systems 500 are stereophonically driven. Note that a plurality of loudspeakers 501 may be provided in loudspeaker box 502. Furthermore, in headrest 130, only one loudspeaker system 500 may be provided, or three or more loudspeaker systems 500 may be provided.

Loudspeaker system 500 can expose the person seated on seat 100 to a sound wave from headrest 130 of seat 100.

Tweeter 600 is provided at headrest 130. For example, tweeter 600 is capable of reproducing sound in a band from 20 kHz to 100 kHz. As illustrated in FIG. 1, for example, two tweeters 600 are provided at headrest 130, and two tweeters 600 are stereophonically driven. Note that at headrest 130, only one tweeter 600 may be provided, or three or more tweeters 600 may be provided.

The person seated on seat 100 can be exposed to sound waves from headrest 130 of seat 100 by tweeter 600.

Note that by signal processing device 10 according to Embodiment 2 or signal processing device 40 according to Embodiment 3 that will be described later, ultrasonic waves may be outputted from loudspeaker 501 or tweeter 600, and in this case, a person seated on seat 100 can be exposed to ultrasonic waves from headrest 130 of seat 100.

Furthermore, by signal processing device 10 according to Embodiment 2 described later, actuator 203 generates vibration corresponding to an acoustic signal included in data of one track among data of a plurality of tracks that constitute a musical piece, and loudspeaker 201 may reproduce an acoustic signal included in data of another track of data of the plurality of tracks. Specifically, actuator 203 generates vibration corresponding to an acoustic signal of a kick drum included in data of a track of a drum among the data of the plurality of tracks, and loudspeaker 201 may reproduce an acoustic signal included in data of a track other than a drum track among the data of the plurality of tracks.

Furthermore, by signal processing device 40 according to Embodiment 3 described later, actuator 203 generates vibration corresponding to an acoustic signal in a first frequency band included in data of a musical piece, loudspeaker 201 reproduces an acoustic signal in a frequency band excluding the first frequency band included in the data of the musical piece, and the first frequency band may be a band including a resonance frequency of actuator 203.

Next, details of loudspeaker system 200 will be described by using FIG. 2A to FIG. 2D.

FIG. 2A to FIG. 2D are a front view and a cross-sectional view illustrating an example of loudspeaker system 200 according to Embodiment 1. In each of the drawings, (a) is a front view of loudspeaker system 200, and (b) is a cross-sectional view of loudspeaker system 200. Note that in (b) of each of the drawings, detailed illustration of a cross-section of loudspeaker 201 and actuator 203 is omitted.

Actuator 203 is provided in loudspeaker box 202 so as to cause baffle panel 202*a* of loudspeaker box 202 to generate vibration, and is fixed to a surface in loudspeaker box 202 on an opposite side to baffle panel 202*a*, for example, as illustrated in FIG. 2A to FIG. 2D. Furthermore, loudspeaker 201 is fixed by being fitted in a hole provided on baffle panel 202*a* of loudspeaker box 202. In this way, loudspeaker 201 and actuator 203 are integrated by loudspeaker box 202.

For example, a diameter of loudspeaker is 120 mm to 160 mm, and a diameter of actuator 203 is 70 mm to 80 mm. A distance from a center of loudspeaker 201 to a center of actuator 203 when viewing loudspeaker system 200 from a front is, for example, 120 mm to 150 mm. Since loudspeaker 201 and actuator 203 are integrated, the distance between loudspeaker 201 and actuator 203 can be shortened.

When loudspeaker 201 and actuator 203 are separately provided, the distance between loudspeaker 201 and actuator 203 tends to increase, so that a phase of sound outputted from loudspeaker 201 and a phase of vibration by actuator 203 tend to deviate from each other, and powerful sound and vibration sometimes cannot be provided to a person seated on seat 100. In regard with this, according to loudspeaker system 200 and seat 100 according to Embodiment 1, loudspeaker 201 and actuator 203 are integrated by one loudspeaker box 202, so that the distance between loudspeaker 201 and actuator 203 can be shortened, and the phase of sound outputted from loudspeaker 201 and the phase of vibration by actuator 203 easily match to each other. Accordingly, it is possible to provide powerful sound and vibration to the person seated on seat 100.

Figure 3:
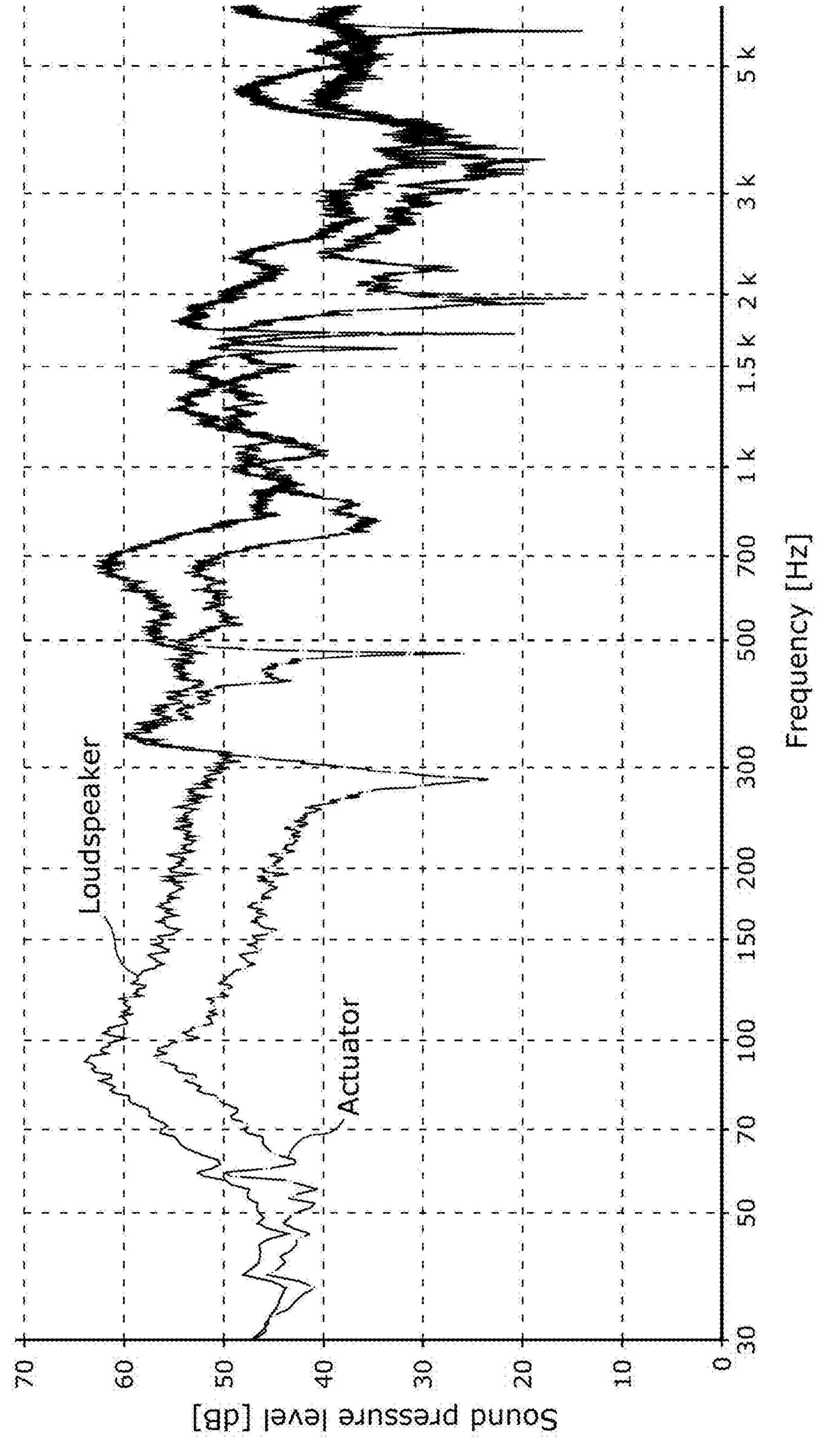
FIG. 3 is a graph illustrating an example of frequency response of sounds (sound pressure) outputted from a loudspeaker and an actuator included in a loudspeaker system according to Embodiment 1.

FIG. 3 is a graph illustrating an example of frequency response of sounds (sound pressure) outputted from loudspeaker 201 and actuator 203 included in loudspeaker system 200 according to Embodiment 1. FIG. 3 illustrates frequency responses of sounds outputted from loudspeaker 201 and sounds (vibration) outputted from actuator 203 that are measured at a distance of 50 cm from a front surface of loudspeaker system 200.

As illustrated in FIG. 3, it can be seen that there is a corresponding relationship between loudspeaker 201 and actuator 203 in the way of change of a sound pressure level with respect to the frequency, and phases of sounds (vibration) outputted from them are roughly aligned with each other.

Figure 2B:
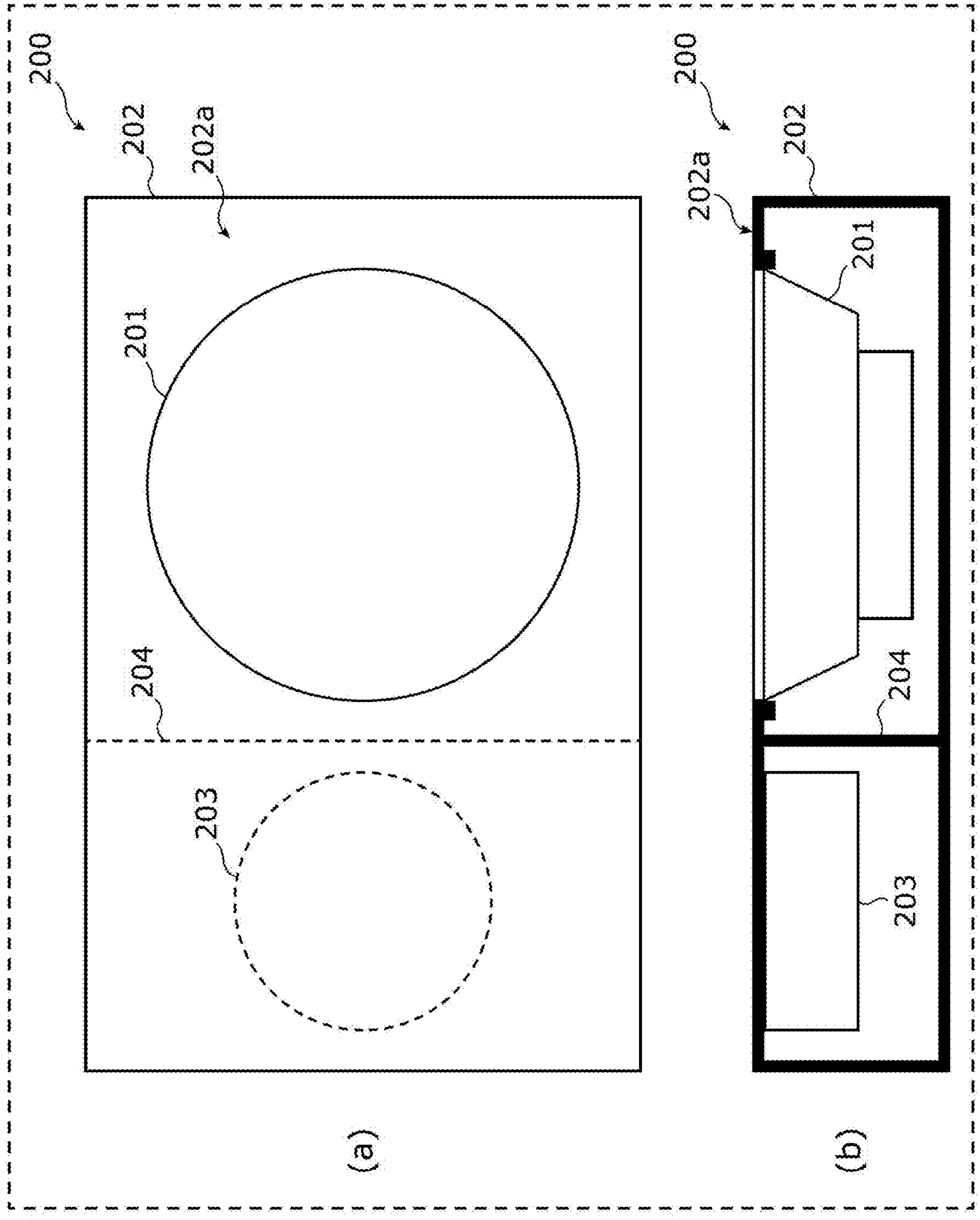
FIG. 2B illustrates a front view and a cross-sectional view of an example of a loudspeaker system according to Embodiment 1.

For example, as illustrated in FIG. 2B, loudspeaker box 202 may have partition 204 that separates actuator 203 and loudspeaker 201 in loudspeaker box 202. Since actuator 203 and loudspeaker 201 can be separated by partition 204, it is possible to make it difficult for loudspeaker 201 to be affected by the vibration by actuator 203, and it is possible to make it difficult for actuator 203 to be affected by the vibration by loudspeaker 201. For example, partition 204 may be formed of a same member as loudspeaker box 202, or may be formed of a different member.

Figure 2C:
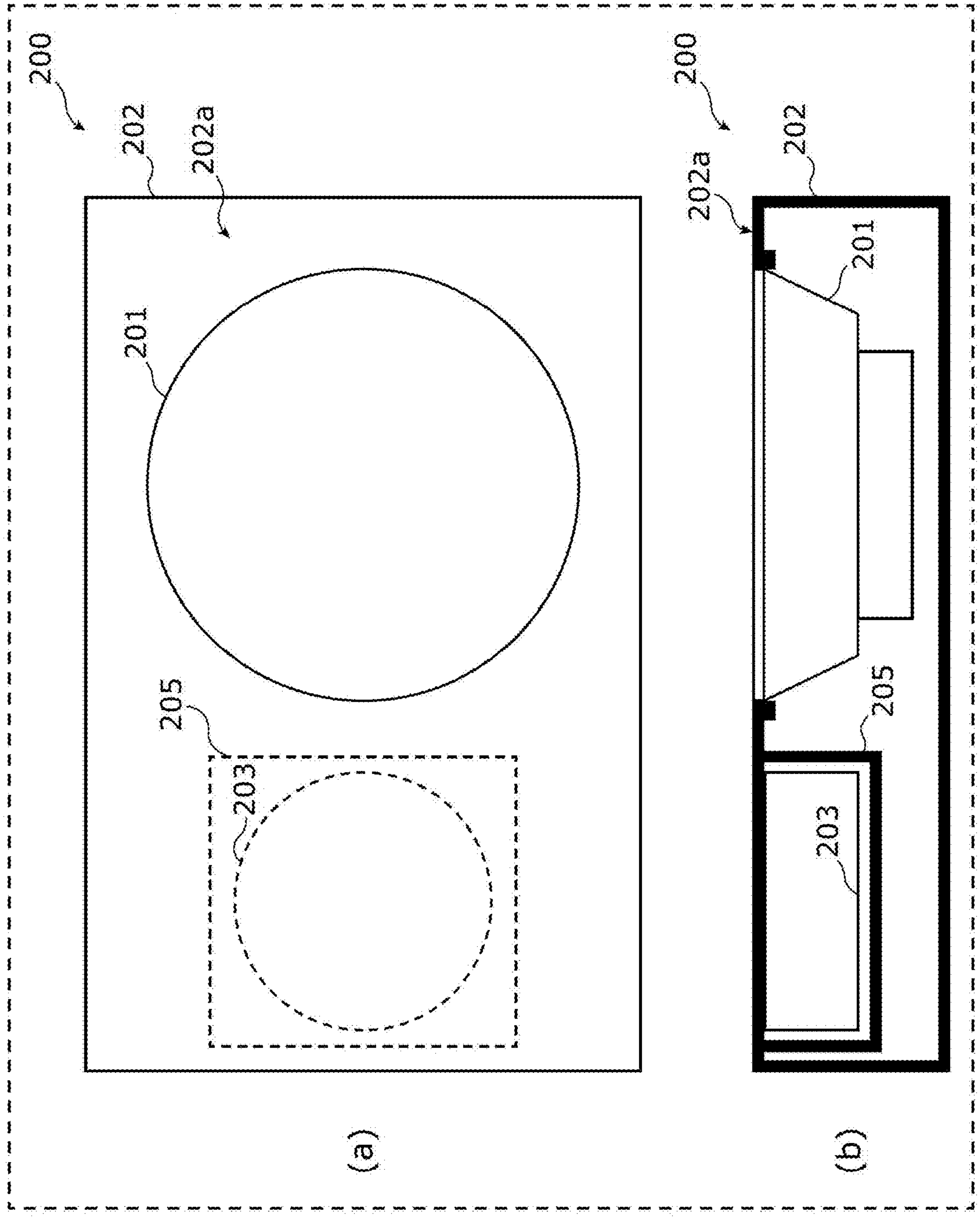
FIG. 2C illustrates a front view and a cross-sectional view of an example of a loudspeaker system according to Embodiment 1.

For example, as illustrated in FIG. 2C, loudspeaker box 202 may have sealed portion 205 that seals actuator 203 in loudspeaker box 202. Since actuator 203 is sealed, it is possible to make it difficult for loudspeaker 201 to be affected by the vibration by actuator 203, and it is possible to make it difficult for actuator 203 to be affected by the vibration by loudspeaker 201. For example, sealed portion 205 may be formed of a same member as loudspeaker box 202, or may be formed of a different member.

Figure 2D:
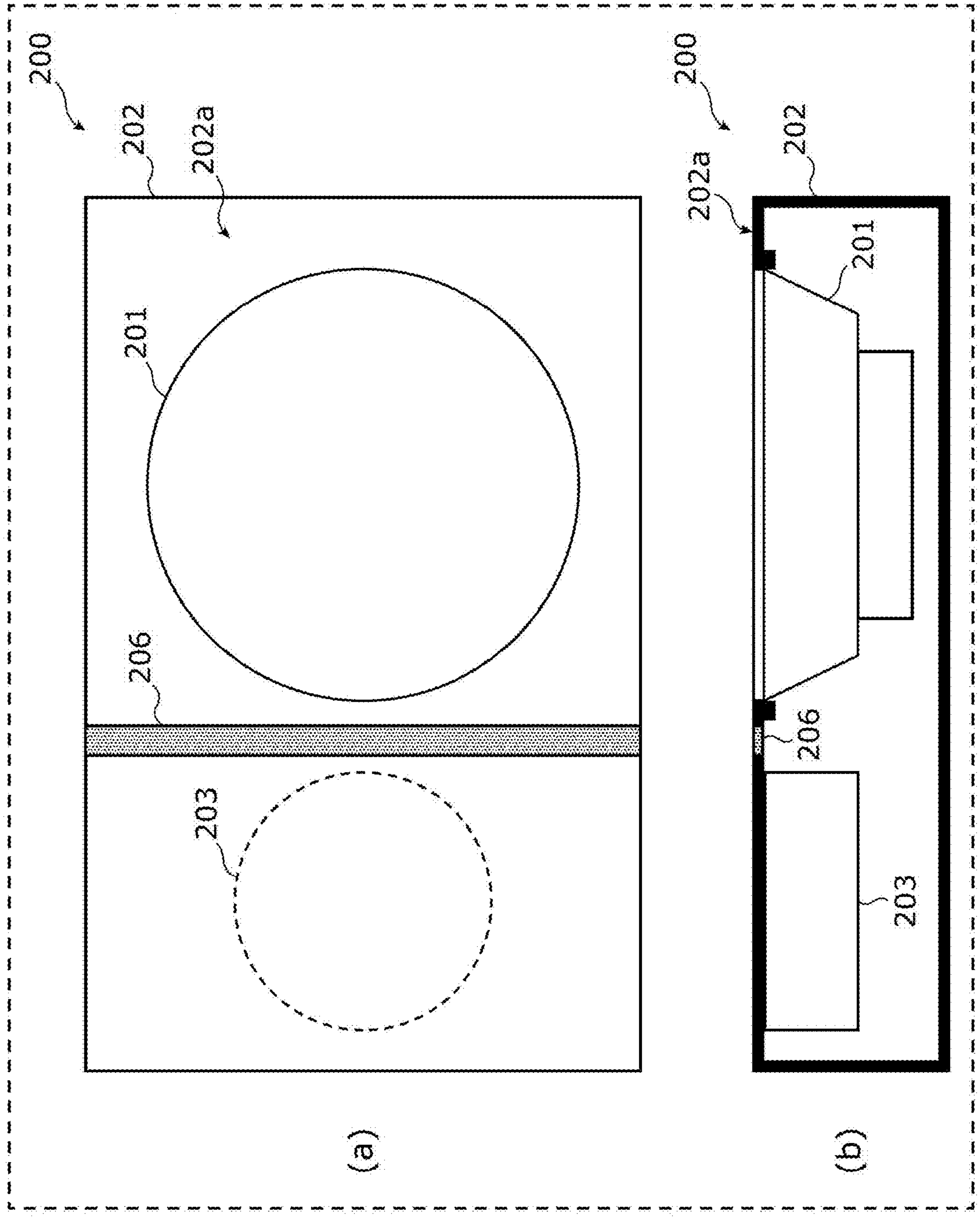
FIG. 2D illustrates a front view and a cross-sectional view of an example of a loudspeaker system according to Embodiment 1.

For example, as illustrated in FIG. 2D, a material of portion 206 of baffle panel 202*a* located between actuator 203 and loudspeaker 201 in a plan view of baffle panel 202*a* may be softer than a material of other portions of baffle panel 202*a*. Since vibration can be absorbed by portion 206 of the soft material of baffle panel 202*a*, it is possible to make it difficult for loudspeaker 201 to be affected by the vibration by actuator 203, and it is possible to make it difficult for actuator 203 to be affected by the vibration by loudspeaker 201. For example, the material of portion 206 is not particularly limited as long as the material is softer than the other portions (for example, loudspeaker box 202) of baffle panel 202*a*.

For example, loudspeaker box 202 may have two or more of partition 204, sealed portion 205 and portion 206.

Embodiment 2

Next, a signal processing device according to Embodiment 2 will be described with reference to the drawings.

Figure 4:
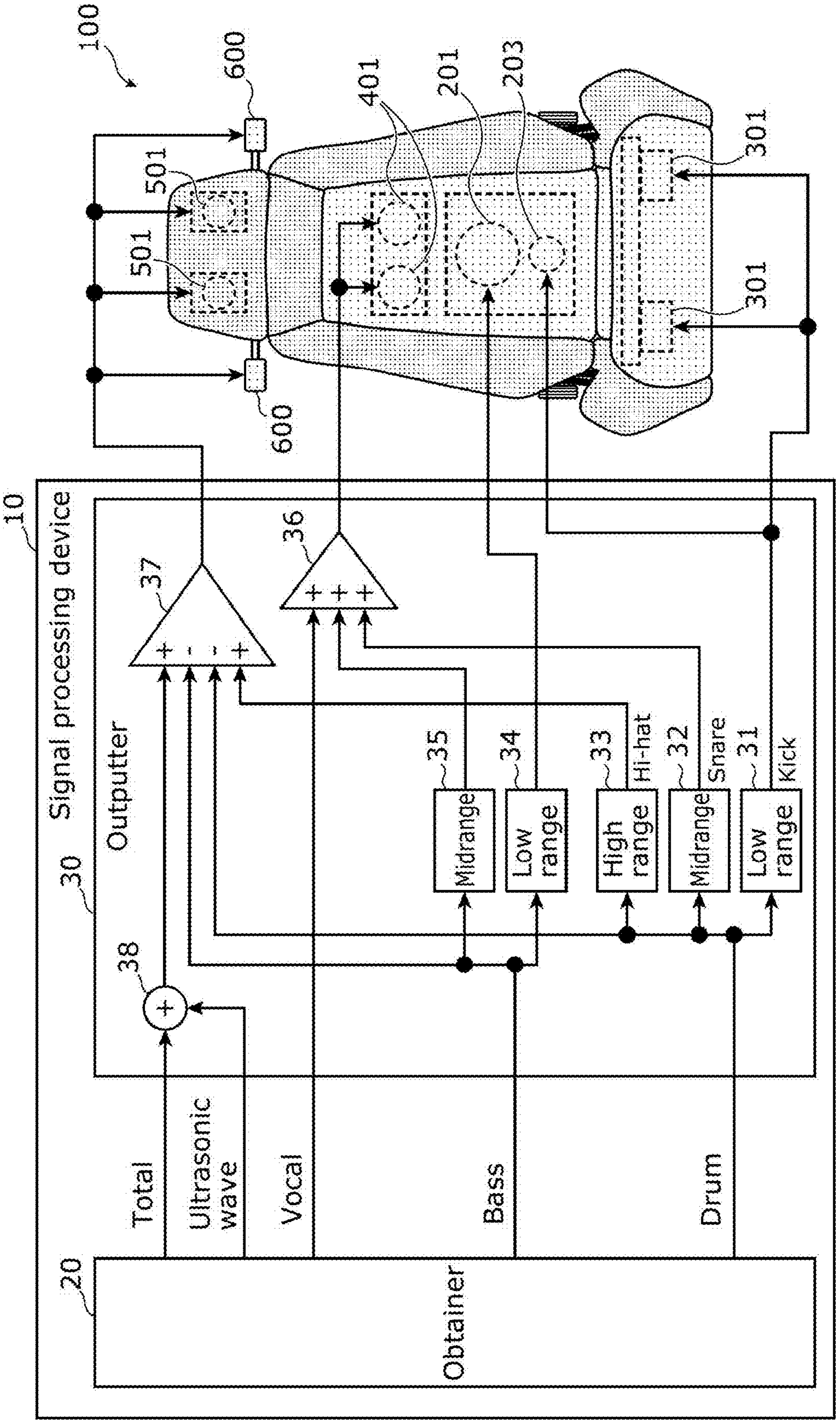
FIG. 4 is a block diagram illustrating an example of a signal processing device according to Embodiment 2.

FIG. 4 is a block diagram illustrating an example of signal processing device 10 according to Embodiment 2. Note that FIG. 4 also illustrates seat 100 besides signal processing device 10.

Signal processing device 10 is a device for reproducing a musical piece from one or more loudspeakers and one or more actuators that are provided in seat 100. Signal processing device 10 includes obtainer 20 and outputter 30. Signal processing device 10 includes a processor, a memory, and so on. The memory is a ROM (Read Only Memory) and a RAM (Random Access Memory) or the like and can store a program that is executed by a processor. Obtainer and outputter 30 are realized by a processor or the like that executes a program stored in the memory.

Obtainer 20 obtains data of a plurality of tracks forming a musical piece. For example, obtainer 20 obtains data of a plurality of tracks by obtaining data of a musical piece that is mixed-down from a music source such as CD (Compact Disc) and extracting data of a plurality of tracks from the obtained data of the musical piece. Note that obtainer 20 may obtain data of a plurality of tracks prepared in advance. The plurality of tracks are a plurality of tracks that are reproduced simultaneously in parallel. The data of the plurality of tracks include, for example, data of a track of a vocal, data of a track of a bass, data of a track of a drum, data of a track of a guitar, data of a track of a keyboard, and so on.

Furthermore, for example, obtainer 20 may obtain an ultrasonic signal. Though not illustrated, for example, signal processing device 10 may include an ultrasonic generator, and obtainer 20 may obtain an ultrasonic signal generated in the ultrasonic generator. For example, the ultrasonic generator has a pitch controller and an extractor.

For example, the pitch controller controls a pitch (sound height) of data of a musical piece by n (n is a real number greater than 1) times. As the pitch of the data of the musical piece is multiplied by n, overall frequency components of the data of the musical piece shift to an n-fold higher frequency side. A value of n is not particularly limited, and is set at a value in which frequency components of 20 kHz or higher are included in sound source data the pitch of which is controlled. For example, the pitch controller obtains a maximum frequency component included in the data of the musical piece, and when the maximum frequency component is smaller than 20 kHz, the pitch controller may set n at a value larger than or equal to a value obtained by dividing 20 kHz by the maximum frequency component. For example, n may be 2 raised to the m (m is an integer larger than or equal to 1) power. That is to say, the pitch controller controls the pitch of the data of the musical piece to 2 raised to the m power (twice, four times, eight times, . . . and so on). Note that people can obtain an improvement effect on their mental and physical conditions by being exposed to ultrasonic waves, but the degree of the improvement effect on their mental and physical conditions obtained by ultrasonic waves may differ depending on the value of m. Thus, the ultrasonic generator may include an input unit that receives information indicating the degree of improvement effect on mental and physical conditions which the user desires to obtain, and the pitch controller may control the value of m according to information received by the input unit. Accordingly, the user can obtain the improvement effect of the degree desired by the user.

Note that the pitch controller may control a sound pressure level in addition to the pitch. At this time, the pitch controller may increase the sound pressure level, or decrease the sound pressure level.

The extractor extracts frequency components higher than or equal to 20 kHz that are included in the data of the musical piece the pitch of which is controlled. The extractor is, for example, a high pass filter. The extractor is realized, for example, by a digital filter, but may be realized by an analogue filter.

Note that the extractor extracts frequency components of frequencies higher than or equal to a specific frequency (for example, 4 kHz or the like) that are included in the data of the musical piece first, and subsequently, the pitch controller may multiply the extracted frequency components by n (for example, by 10 times or the like). In this way, the frequency components of 20 kHz or higher can also be extracted.

In this manner, the ultrasonic generator generates ultrasonic signals (acoustic signals including the frequency components of 20 kHz or higher), and obtainer 20 may obtain ultrasonic signals from the ultrasonic generator.

Outputter 30 outputs an acoustic signal included in data of one track among the data of a plurality of tracks to one or more actuators, and outputs an acoustic signal included in data of another track among the data of the plurality of tracks to any loudspeaker of the one or more loudspeakers.

Depending on the acoustic signal included in the data of the plurality of tracks forming the musical piece, uncomfortable vibration may be given to a person seated on seat 100 when the acoustic signal is outputted to the actuator. For example, when an acoustic signal included in a track of a bass where continuous heavy bass sound is generated is outputted to the actuator, continuous vibration is generated and uncomfortable vibration may be given to the person seated on seat 100. In regard to this, according to signal processing device 10 according to Embodiment 2, an acoustic signal included in data of a specific track can be outputted to the actuator, in other words, an acoustic signal included in data of a track that hardly gives uncomfortable vibration to the person seated on seat 100 can be outputted to the actuator. Accordingly, giving uncomfortable vibration to the person seated on seat 100 can be suppressed.

For example, outputter 30 may output an acoustic signal of a kick drum that is included in data of a track of a drum among the data of the plurality of tracks to one or more actuators. For example, outputter 30 has low pass filter 31, extracts the acoustic signal of the kick drum by inputting the data of the track of the drum to low pass filter 31, and outputs the acoustic signal to the one or more actuators. Low pass filter 31 is realized by a digital filter, for example, but may be realized by an analogue filter. Note that when data of a track of a kick drum exists, obtainer 20 may obtain the data of the track of the kick drum. In this case, outputter 30 need not have low pass filter 31, and may output the data of the track of the kick drum to one or more actuators without a filter. Vibration of the kick drum is not continuous vibration by heavy bass sound of a stringed instrument, but crisp rhythmic vibration, and hardly gives uncomfortable vibration from the actuator to the person seated on seat 100, so that giving uncomfortable vibration to the person seated on seat 100 can be suppressed.

The one or more actuators include, for example, actuator 301 provided inside seat surface 120 of seat 100 at a position corresponding to thighs of a person on seat surface 102 when the person is seated on seat 100, or actuator 203 provided inside seat back 110 of seat 100 at a position corresponding to a sacrum of the person in seat back 110, as described above.

For example, outputter 30 may output the acoustic signal of the kick drum included in the data of the track of the drum among data of a plurality of tracks to actuator 301. Accordingly, it is possible to give powerful vibration by the kick drum to the thighs of the person seated on seat 100.

For example, outputter 30 may output the acoustic signal of the kick drum included in the data of the track of the drum among the data of a plurality of tracks to actuator 203. Accordingly, it is possible to give powerful vibration by the kick drum to the sacrum of the person seated on seat 100.

Furthermore, for example, outputter 30 may output acoustic signals included in data of tracks other than the track of the drum among the data of a plurality of tracks to any loudspeaker of one or more loudspeakers.

The one or more loudspeakers include loudspeaker 201 that is provided inside seat back 110 of seat 100 at a position corresponding to an abdominal region of a person in seat back 110 when the person is seated on seat 100, loudspeaker 401 that is provided inside seat back 110 of seat 100 at a position corresponding to a back of a person in seat back 110, loudspeaker 501 provided inside headrest 130 of seat 100, or tweeter 600 attached to headrest 130, for example, as described above.

For example, outputter 30 may output an acoustic signal included in data of a track of a bass among the data of a plurality of tracks to loudspeaker 201. For example, outputter 30 outputs an acoustic signal in a low rage included in the data of the track of the bass to loudspeaker 201. Accordingly, it is possible to expose the abdominal region of the person seated on seat 100 to a sound wave of heavy bass sound of the bass, and it is possible to provide powerful sound with vibration. For example, outputter 30 has low pass filter 34, extracts an acoustic signal in a low range of a bass by inputting the data of the track of the bass to low pass filter 34, and outputs the acoustic signal to loudspeaker 201. Low pass filter 34 is realized by a digital filter, for example, but may be realized by an analogue filter.

For example, outputter 30 may output an acoustic signal of a snare included in the data of the track of the drum, an acoustic signal included in the data of the track of the bass, and an acoustic signal included in data of a track of a vocal to loudspeaker 401, among the data of a plurality of tracks.

For example, outputter 30 has mid pass filter 32, extracts an acoustic signal of a snare by inputting the data of the track of the drum to mid pass filter 32, and outputs the acoustic signal to loudspeaker 401. Mid pass filter 32 is a filter having a higher passband than low pass filter 31. Mid pass filter 32 is realized by, for example, a digital filter, but may be realized by an analogue filter. Note that when data of the track of the snare exists, obtainer 20 may obtain the data of the track of the snare, and in this case, outputter need not have mid pass filter 32, and may output the data of the track of the snare to loudspeaker 401 without a filter.

For example, outputter 30 has mid pass filter 35, extracts an acoustic signal in a midrange of a bass by inputting the data of the track of the bass to mid pass filter 35, and outputs the acoustic signal to loudspeaker 401. Mid pass filter 35 is a filter having a higher passband than low pass filter 34. Mid pass filter 35 is realized by, for example, a digital filter, but may be realized by an analogue filter.

For example, outputter 30 has adder 36, and inputs an acoustic signal of a snare, an acoustic signal in a midrange of a bass, and an acoustic signal of a vocal to adder 36. Accordingly, outputter can add the acoustic signal of the snare, the acoustic signal in the midrange of the bass, and the acoustic signal of the vocal, and can output the added acoustic signals to loudspeaker 401.

Accordingly, it is possible to output sounds of the snare, bass, and vocal from the position corresponding to the back of the person seated on seat 100.

For example, outputter 30 may output acoustic signals included in data of tracks except for the bass and drum among the data of a plurality of tracks, and an acoustic signal of a hi-hat included in the data of the track of the drum to loudspeaker 501 or tweeter 600.

For example, outputter 30 has high pass filter 33, extracts an acoustic signal of a hi-hat by inputting the data of the track of the drum to high pass filter 33, and outputs the acoustic signal to loudspeaker 501 and tweeter 600. High pass filter 33 is a filter having a higher passband than mid pass filter 32. High pass filter 33 is realized by, for example, a digital filter, but may be realized by an analogue filter. Note that when data of a track of a hi-hat exists, obtainer 20 may obtain the data of the track of the hi-hat, and in this case, outputter 30 need not have high pass filter 33, and may output the data of the track of the hi-hat to loudspeaker 501 and tweeter 600 without a filter.

For example, outputter 30 has adder/subtractor 37. For example, outputter 30 inputs acoustic signals included in data of total tracks including all of the data of the track of the vocal, data of the track of the bass, data of the track of the drum, data of the track of the guitar, data of the track of the keyboard, and so on, and an acoustic signal of the hi-hat to a plus terminal of adder/subtractor 37. Furthermore, for example, outputter 30 inputs an acoustic signal included in the data of the track of the drum, and an acoustic signal included in the data of the track of the bass to a minus terminal of adder/subtractor 37. Accordingly, outputter 30 can subtract the acoustic signal included in the data of the track of the drum and the acoustic signal included in the data of the track of the bass from the acoustic signals included in the data of the total tracks, and add the acoustic signals and an acoustic signal of the hi-hat. In other words, it is possible to output signals obtained by adding up the acoustic signals included in the data of the tracks except for the tracks of the bass and drum among the data of the plurality of tracks, and the acoustic signal of the hi-hat included in the data of the track of the drum to loudspeaker 501 and tweeter 600.

Accordingly, it is possible to output sounds (for example, sounds of the vocal, guitar, keyboard and so on) other than sounds of the bass and drum, and the sound of the hi-hat from headrest 130.

For example, outputter 30 may further output ultrasonic signals to loudspeaker 501 or tweeter 600. For example, outputter has adder 38, and as described above, when obtainer 20 obtains an ultrasonic signal, outputter 30 inputs acoustic signals included in the data of the total tracks, and the ultrasonic signal to adder 38. Accordingly, it is possible to add up the acoustic signals included in the data of the total tracks and the ultrasonic signal, and it is possible to output the acoustic signals to which the ultrasonic signal is added to loudspeaker 501 or tweeter 600.

Accordingly, it is possible to expose the head of a person seated on seat 100 to ultrasonic waves, and it is possible to give a hypersonic effect onto the person seated on seat 100. Specifically, it is possible to give an effect of improving cerebral blood flow and improving mental and physical conditions to the person seated on seat 100.

Embodiment 3

Next, the signal processing device according to Embodiment 3 will be described with reference to the drawings.

Figure 5:
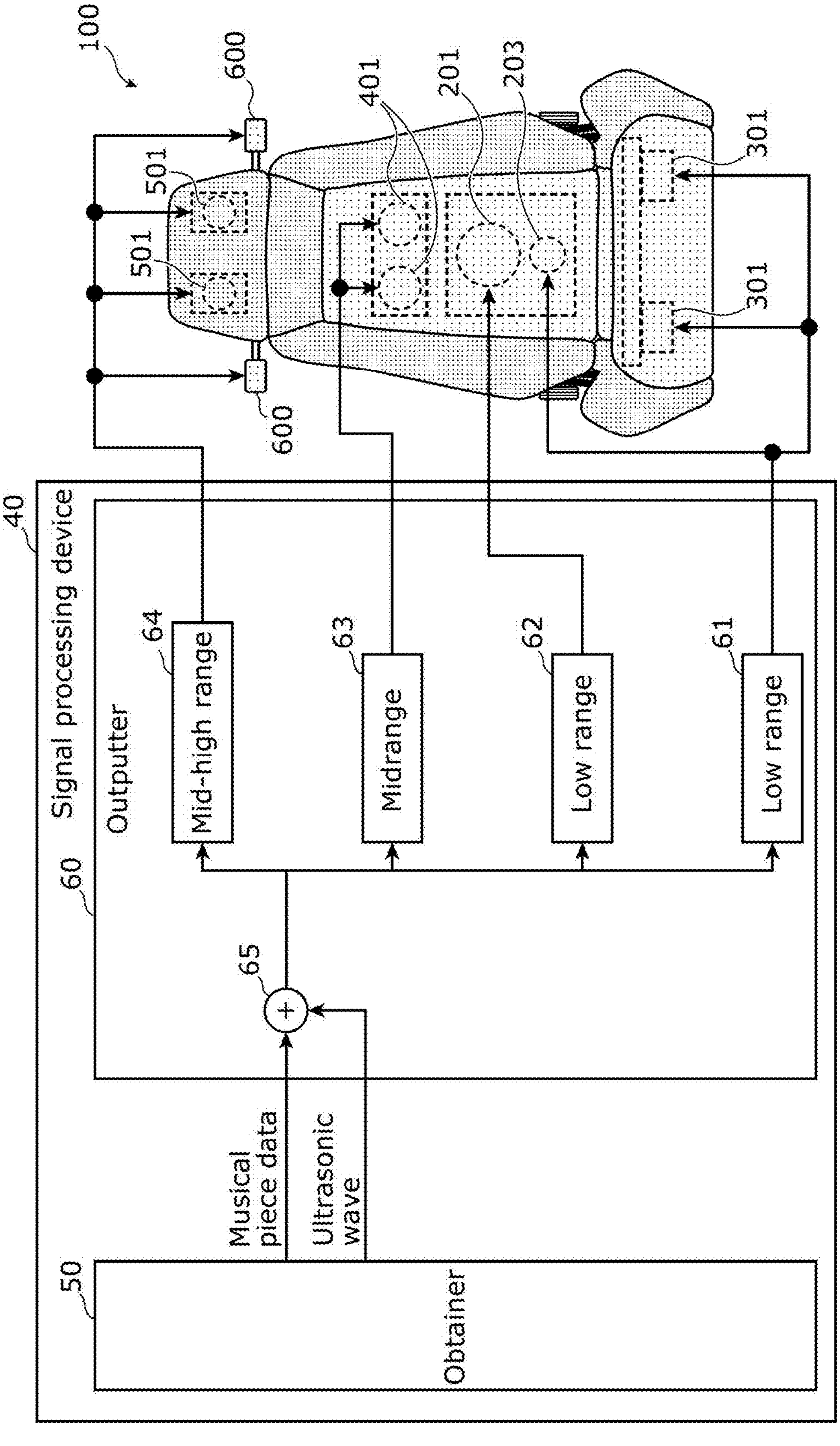
FIG. 5 is a block diagram illustrating an example of a signal processing device according to Embodiment 3.

FIG. 5 is a block diagram illustrating an example of signal processing device 40 according to Embodiment 3. Note that FIG. 5 also illustrates seat 100 besides signal processing device 40.

Signal processing device 40 is a device for reproducing a musical piece from one or more loudspeakers and one or more actuators that are provided in seat 100. Signal processing device 40 includes obtainer 50 and outputter 60. Signal processing device 40 includes a processor, a memory and so on. The memory is a ROM and a RAM or the like, and can store a program that is executed by the processor. Obtainer 50 and outputter 60 are realized by the processor or the like that executes a program stored in the memory.

Obtainer 50 obtains data of a musical piece. Specifically, obtainer 50 obtains the data of a musical piece that is mixed down from a music source such as a CD.

Furthermore, for example, obtainer 50 may obtain an ultrasonic signal. For example, signal processing device 40 may include an ultrasonic generator as in signal processing device 10, and obtainer 50 may obtain an ultrasonic signal generated in the ultrasonic generator. Details of the ultrasonic generator are the same as that described in Embodiment 2 and therefore, explanation will be omitted.

Outputter 60 outputs an acoustic signal in a first frequency band included in data of a musical piece to the one or more actuators, and outputs an acoustic signal in a frequency band except for the first frequency band included in the data of the musical piece to the one or more loudspeakers. The first frequency band is a band including a resonance frequency of the one or more actuators. For example, outputter 60 outputs the acoustic signal in the first frequency band to the one or more actuators and outputs the acoustic signal in the frequency band except for the first frequency band to the one or more loudspeakers, by applying filtering processing to the data of the musical piece. For example, the one or more actuators include actuator 203 or 301, and the one or more loudspeakers include loudspeaker 201.

When the system described in PTL 1 is applied to a seat in which actuators and loudspeakers are provided, signals in the same frequency band are inputted to the actuator and the loudspeaker, and thus uncomfortable vibration can be given to the person seated on the seat. In regard to this, in Embodiment 3, frequency bands of signals that are outputted to actuator 203 or 301 and loudspeaker 201 are different, and thus it is possible to expose optimal spots of the person seated on seat 100 to vibration and heavy bass sound from actuator 203 or 301, and loudspeaker 201 respectively, and giving uncomfortable vibration to the person seated on seat 100 can be suppressed.

For example, vibration of a kick drum is not continuous vibration by heavy bass sound of a stringed instrument, but is crisp rhythmic vibration, and hardly gives uncomfortable vibration to the person seated on seat 100. Furthermore, a vibration frequency of the rhythmic vibration like this is a frequency close to a resonance frequency of actuator 203 or 301. Thus, giving uncomfortable vibration to the person seated on seat 100 can be suppressed by outputting, to actuator 203 or 301, an acoustic signal in the first frequency band including the resonance frequency of actuator 203 or 301, specifically, an acoustic signal of rhythmic vibration with the vibration frequency close to the resonance frequency of actuator 203 or 301. For example, it is possible to give powerful vibration by actuator 203 or 301 to the thighs or the sacrum of the person seated on seat 100. Furthermore, when heavy bass sound is outputted from loudspeaker 201, it is possible to expose the abdominal region of the person seated on seat 100 to sound waves of the heavy bass sound, and it is possible to provide powerful sound with vibration.

For example, outputter 60 has low pass filters 61 and 62. For example, outputter 60 extracts an acoustic signal in the first frequency band included in the data of a musical piece, by inputting the data of the musical piece to low pass filter 61, and outputs the acoustic signal to actuators 203 and 301. Furthermore, for example, outputter 60 extracts an acoustic signal in a frequency band except for the first frequency band included in the data of the musical piece, by inputting the data of the musical piece to low pass filter 62, and outputs the acoustic signal to loudspeaker 201. Low pass filters 61 and 62 are realized by digital filters, for example, but may be realized by analogue filters.

Figure 6:
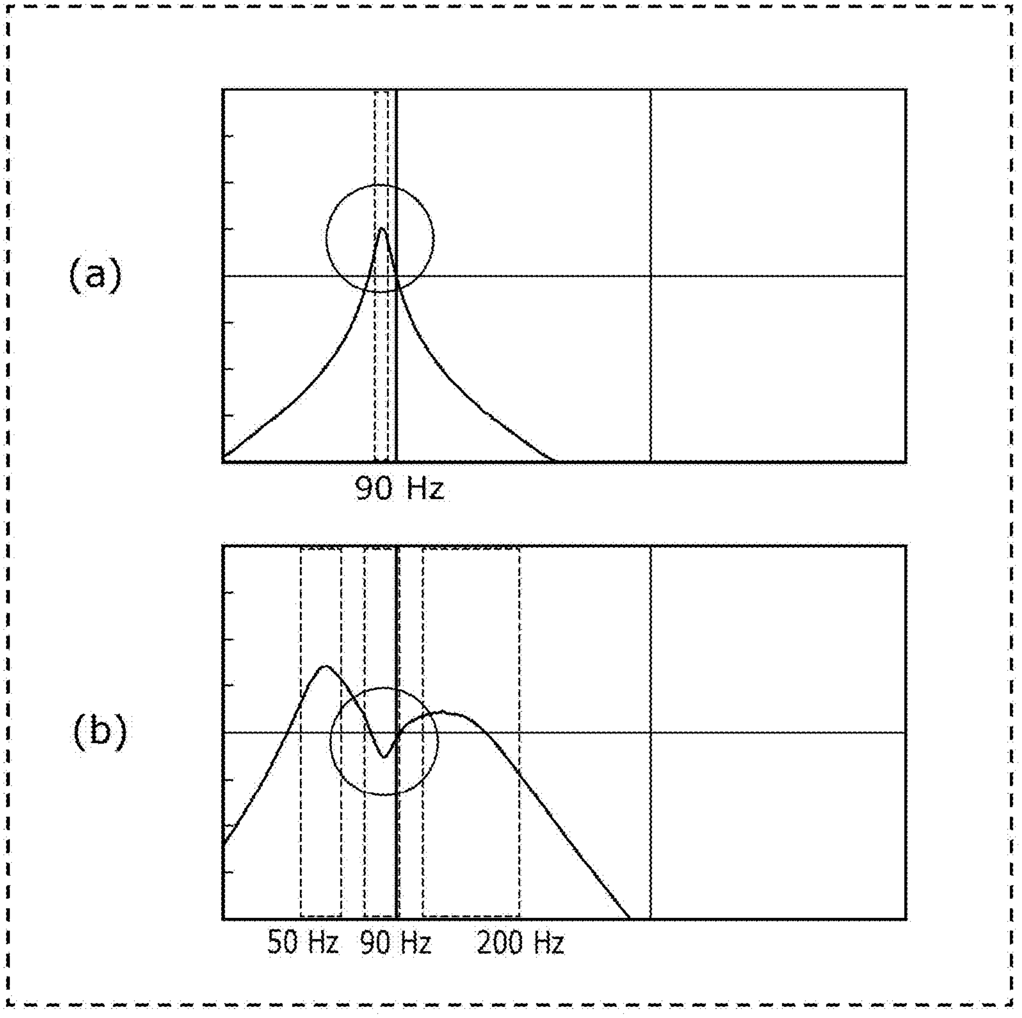
FIG. 6 is diagram illustrating an example of filter characteristics of a low pass filter included in an outputter according to Embodiment 3.

FIG. 6 is a view illustrating an example of filter characteristics of low pass filters 61 and 62 included in outputter 60 according to Embodiment 3. In FIG. 6, (a) illustrates filter characteristics of low pass filter 61, and (b) in FIG. 6 illustrates filter characteristics of low pass filter 62.

As illustrated in (a) in FIG. 6, low pass filter 61 is, for example, a band pass filter with a high Q value, and has a band including the resonance frequency (for example, 90 Hz) of actuators 203 and 301 as a passband. Accordingly, it is possible to output acoustic signals in the first frequency band (band including 90 Hz, for example) included in the data of the musical piece to actuators 203 and 301, and actuators 203 and 301 can generate rhythmic vibration of a kick drum or the like.

On the other hand, as illustrated in (b) in FIG. 6, low pass filter 62 is, for example, a band elimination filter, and has the first frequency band as a stopband. Since the acoustic signals in the first frequency band including the resonance frequency of actuators 203 and 301 are attenuated by low pass filter 62, it is possible to suppress amplitude interference of acoustic signals in the frequency band except for the first frequency band and the acoustic signals in the first frequency band.

For example, outputter 60 may have mid pass filter 63. Mid pass filter 63 is a filter having a higher passband than low pass filter 61. For example, outputter 60 extracts acoustic signals in a midrange (for example, 150 Hz to 800 Hz) included in data of a musical piece, by inputting the data of the musical piece in mid pass filter 63, and outputs the acoustic signals to loudspeaker 401. Mid pass filter 63 is realized by, for example, a digital filter, but may be realized by an analogue filter. Accordingly, it is possible to output sound of a snare, bass, vocal and so on from a position corresponding to the back of the person seated on seat 100.

For example, outputter 60 may have mid-high pass filter 64. Mid-high pass filter 64 is a filter having a higher passband than mid pass filter 63. For example, outputter 60 extracts acoustic signals in a mid-high range (for example, 350 Hz to 100 kHz) included in the data of a musical piece, by inputting the data of the musical piece to the mid-high pass filter 64, and outputs the acoustic signals to loudspeaker 501 or tweeter 600. Mid pass filter 63 and mid-high pass filter 64 are realized by, for example, digital filters, but may be realized by analogue filters. Accordingly, it is possible to output sounds of a guitar, keyboard, vocal, hi-hat and so on from headrest 130.

For example, outputter 60 may further output ultrasonic signals to loudspeaker 501 or tweeter 600. For example, outputter 60 has adder 65, and when obtainer 50 obtains an ultrasonic signal, outputter 60 inputs the data of a musical piece and the ultrasonic signal to adder 65, as described above. Accordingly, it is possible to add up the data of the musical piece and the ultrasonic signal, and it is possible to output an acoustic signal including the ultrasonic signal extracted from the data of the musical piece to which the ultrasonic signal is added to loudspeaker 501 or tweeter 600.

Accordingly, it is possible to expose the head of the person seated on seat 100 to an ultrasonic wave, and it is possible to give a hypersonic effect to the person seated on seat 100. Specifically, it is possible to give an effect of improving a cerebral blood flow and improving mental and physical conditions to the person seated on seat 100.

Other Embodiments

Exemplary embodiments have been described above as examples of the techniques according to the present disclosure. The techniques according to the present disclosure are not limited to the foregoing exemplary embodiments, and are also applicable to embodiments obtained by making changes, substitutions, additions, omissions, or the like, as appropriate. For example, variations such as those described below are included in one embodiment of the present disclosure.

For example, in Embodiment 1 described above, the example in which seat 100 includes loudspeaker systems 200, 400, and 500, and actuator system 300 is described, but seat 100 can include at least loudspeaker system 200.

For example, in Embodiment 1 described above, the example in which loudspeaker system 200 is provided inside seat back 110 of seat 100 at the position that is below the center in seat back 110 is described, but loudspeaker system 200 may be provided inside seat back 110 of seat 100 at a position that is above the center of seat back 110, or may be provided inside seat surface 120.

For example, in each of Embodiments 2 and 3 described above, the example in which seat 100 includes actuators 203 and 301, loudspeakers 201, 401, and 501, and tweeter 600 is described, but the present disclosure is not limited to the example. For example, seat 100 can include at least one actuator of actuators 203 and 301, and can include at least one loudspeaker of loudspeakers 201, 401, and 501, and tweeter 600.

For example, in each of Embodiments 2 and 3 described above, the example in which ultrasonic signals are outputted from loudspeaker 501 or tweeter 600 is described, but ultrasonic signals need not be outputted from loudspeaker 501 or tweeter 600.

For example, in each of Embodiments 1 to 3 described above, the example in which seat 100 includes headrest 130 is described, but seat 100 need not include headrest 130.

For example, the present disclosure can be implemented, not only as signal processing device 40, but also as a signal processing method including the steps (processes) performed by the structural components included in signal processing device 40.

Figure 7:
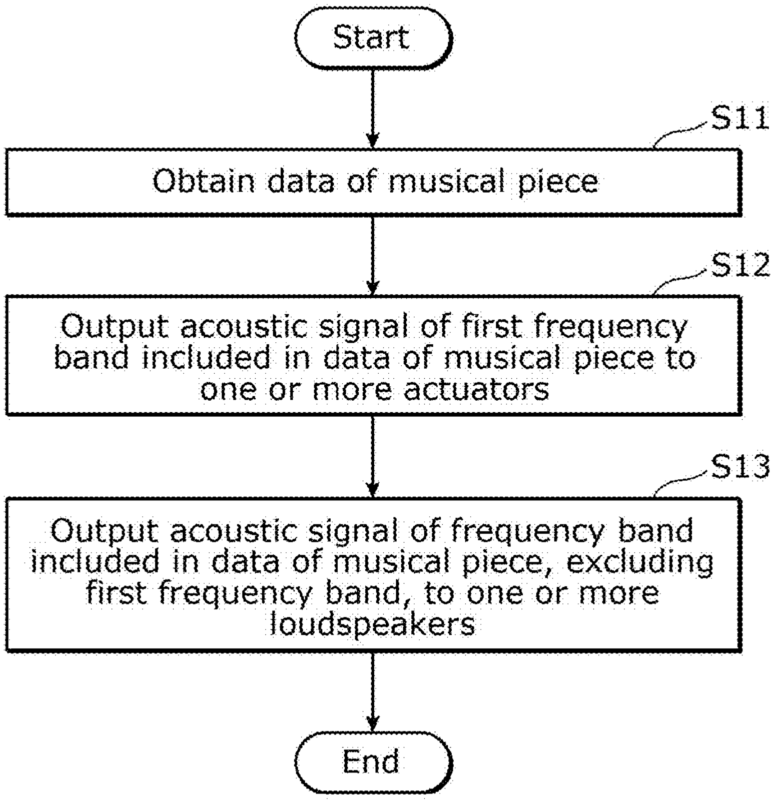
FIG. 7 is a flowchart illustrating an example of a signal processing method according to another embodiment.

FIG. 7 is a flowchart illustrating an example of a signal processing method according to another embodiment.

The signal processing method is a signal processing method for reproducing a musical piece from one or more loudspeakers and one or more actuators that are provided in seat 100. As illustrated in FIG. 7, the signal processing method includes: obtaining data of the musical piece (step S11); and outputting an acoustic signal of a first frequency band included in the data of the musical piece to the one or more actuators (step S12), and outputting an acoustic signal of a frequency band included in the data of the musical piece, excluding the first frequency band, to the one or more loudspeakers (step S13). Here, the first frequency band is a resonance frequency of the one or more actuators.

For example, the steps in the signal processing method may be executed by a computer (computer system). Then, the present disclosure can be implemented as a program for causing the computer to execute the steps included in the signal processing method.

In addition, the present disclosure can be implemented as a non-transitory computer-readable recording medium, such as a CD-ROM, having the program recorded thereon.

Furthermore, when the present disclosure is implemented as a program (software), the respective steps are executed by executing the program using hardware such as a CPU, memory, an input/output circuit, and so on, of a computer. In other words, the respective steps are executed by way of the CPU obtaining data from the memory or the input/output circuit, and so on, and performing an operation, and outputting the operation result to the memory or the input/output circuit.

Furthermore, each of the structural components included in signal processing device 40 in the foregoing embodiments may be implemented as a dedicated or general-purpose circuit.

Furthermore, each of the structural components included in signal processing device 40 in the foregoing embodiments may be implemented as a large-scale integration (LSI), which is an integrated circuit (IC).

Moreover, the integrated circuit is not limited to an LSI, and may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

In addition, when a circuit integration technology that replaces LSIs comes along owing to advances in semiconductor technology or to a separate derivative technology, understandably, circuit integration of the respective structural components included in signal processing device 40 may be carried out using that technology.

Aside from these, the present disclosure includes forms obtained by making various modifications to the foregoing embodiments that can be conceived by those skilled in the art, as well as forms realized by arbitrarily combining structural components and functions in the respective embodiments, without departing from the essence of the present disclosure.

Supplementary Remarks

The disclosures in the foregoing embodiments disclose the techniques described below.

(Technique 1) A signal processing device for reproducing a musical piece from one or more loudspeakers and one or more actuators that are provided in a seat, the signal processing device comprising: an obtainer that obtains data of the musical piece; and an outputter that outputs an acoustic signal of a first frequency band included in the data of the musical piece to the one or more actuators, and outputs an acoustic signal of a frequency band excluding the first frequency band to the one or more loudspeakers, the frequency band being included in the data of the musical piece, wherein the first frequency band is a band including a resonance frequency of the one or more actuators.

When the system described in PTL 1 is applied to a seat in which actuators and loudspeakers are provided, signals in the same frequency band are inputted to the actuator and the loudspeaker, and thus uncomfortable vibration can be given to the person seated on the seat. In regard to this, in the present disclosure, frequency bands of signals that are outputted to the actuator and the loudspeaker are different, and thus it is possible to expose optimal spots of the person seated on the seat to vibration and heavy bass sound from the actuator and the loudspeaker respectively, and giving uncomfortable vibration to the person seated on the seat can be suppressed. For example, vibration of a kick drum is not continuous vibration by heavy bass sound of a stringed instrument, but is crisp rhythmic vibration, and hardly gives uncomfortable vibration to the person seated on the seat. Furthermore, a vibration frequency of the rhythmic vibration like this is a frequency close to a resonance frequency of the actuator. Thus, giving uncomfortable vibration to the person seated on the seat can be suppressed by outputting, to the actuator, an acoustic signal in the first frequency band including the resonance frequency of the actuator, specifically, an acoustic signal of rhythmic vibration with the vibration frequency close to the resonance frequency of the actuator.

(Technique 2) The signal processing device according to Technique 1, wherein the outputter outputs the acoustic signal of the first frequency band to the one or more actuators by filtering the data of the musical piece.

In this manner, by filtering the data of a piece of music, the acoustic signal of a first frequency band can be extracted.

(Technique 3) The signal processing device according to Technique 1 or 2, wherein the outputter outputs the acoustic signal of the frequency band excluding the first frequency band to the one or more loudspeakers by filtering the data of the musical piece.

In this manner, by filtering the data of a piece of music, the acoustic signal of a frequency band excluding the first frequency band can be extracted.

(Technique 4) The signal processing device according to any one of Techniques 1 to 3, wherein the one or more actuators include: a first actuator provided inside a seating surface of the seat, at a position corresponding to thighs of a person when the person is seated on the seat; or a second actuator provided inside a seat back of the seat, at a position corresponding to a sacrum of the person when the person is seated on the seat, and the one or more loudspeakers include a first loudspeaker provided inside the seat back of the seat, at a position corresponding to the thighs of the person when the person is seated on the seat.

Accordingly, it is possible to give powerful vibration by the actuator to the thighs or the sacrum of the person seated on the seat. Furthermore, when heavy bass sound is outputted from the loudspeaker, it is possible to expose the abdominal region of the person seated on the seat to sound waves of the heavy bass sound, and thus it is possible to provide powerful sound with vibration.

(Technique 5) The signal processing device according to any one of Techniques 1 to 4, wherein the outputter further outputs an ultrasonic signal to a loudspeaker provided inside a headrest of the seat or to a tweeter attached to the headrest.

Accordingly, it is possible to expose the head of the person seated on seat 100 to an ultrasonic wave, and it is possible to give a hypersonic effect to the person seated on the seat. Specifically, it is possible to give an effect of improving cerebral blood flow and improving mental and physical conditions to the person seated on the seat.

(Technique 6) A signal processing method for reproducing a musical piece from one or more loudspeakers and one or more actuators that are provided in a seat, the signal processing method comprising: obtaining data of the musical piece; and outputting an acoustic signal of a first frequency band included in the data of the musical piece to the one or more actuators, and outputting an acoustic signal of a frequency band excluding the first frequency band to the one or more loudspeakers, the frequency band being included in the data of the musical piece, wherein the first frequency band is a resonance frequency of the one or more actuators.

Accordingly, it is possible to provide a signal processing method capable of suppressing giving uncomfortable vibration to the person seated on the seat.

(Technique 7) A program for causing a computer to execute the signal processing method according to Technique 6.

Accordingly, it is possible to provide program capable of suppressing giving uncomfortable vibration to the person seated on the seat.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims is incorporated herein by reference in its entirety: Japanese Patent Application No. 2022-155152 filed on Sep. 28, 2022.

INDUSTRIAL APPLICABILITY

The present disclosure can be applied to a seat, and the like, in which a loudspeaker and an actuator are provided inside the seat, and which is capable of reproducing a musical piece.

The invention claimed is:

1. A signal processing device for reproducing a musical piece from one or more loudspeakers and one or more actuators that are provided in a seat, the signal processing device comprising:

an obtainer that obtains data of the musical piece, the musical piece including a plurality of tracks; and an outputter that:

outputs, to the one or more actuators, a first acoustic signal of a first frequency band included in a first track of the musical piece, wherein the first frequency band corresponds to a resonance frequency among a plurality of resonance frequencies of the one or more actuators, and when a second acoustic signal of a second frequency band to be reproduced by the one or more loud speakers includes the first frequency band, modifies, via a filter and prior to transmission to the one or more loud speakers, the second acoustic signal to exclude only the first frequency band corresponding to the resonance frequency among the plurality of resonance frequencies for generating a modified second acoustic signal in a third frequency band, and outputs, to the one or more loudspeakers, the modified second acoustic signal in the third frequency band that excludes only the first frequency band corresponding to the resonance frequency among the plurality of resonance frequencies, the second frequency band being included in a second track of the musical piece, wherein the one or more loudspeakers convert electric signals into a sound, and the one or more actuators convert electric signals into a physical motion.

2. The signal processing device according to claim 1, wherein the outputter outputs the first acoustic signal of the first frequency band to the one or more actuators by filtering the data of the musical piece.

3. The signal processing device according to claim 1, wherein the outputter outputs the second acoustic signal of the third frequency band excluding the first frequency band to the one or more loudspeakers by filtering the data of the musical piece.

4. The signal processing device according to claim 1, wherein the one or more actuators include:

a first actuator provided inside a seating surface of the seat, at a position corresponding to thighs of a person when the person is seated on the seat; or a second actuator provided inside a seat back of the seat, at a position corresponding to a sacrum of the person when the person is seated on the seat, and the one or more loudspeakers include a first loudspeaker provided inside the seat back of the seat, at a position corresponding to the thighs of the person when the person is seated on the seat.

5. The signal processing device according to claim 1, wherein the outputter further outputs an ultrasonic signal to a loudspeaker provided inside a headrest of the seat or to a tweeter attached to the headrest.

6. A signal processing method for reproducing a musical piece from one or more loudspeakers and one or more actuators that are provided in a seat, the signal processing method comprising:

obtaining data of the musical piece, the musical piece including a plurality of tracks;

outputting, to the one or more actuators, a first acoustic signal of a first frequency band included in a first track of the musical piece, wherein the first frequency band corresponds to a resonance frequency among a plurality of resonance frequencies of the one or more actuators;

when a second acoustic signal of a second frequency band to be reproduced by the one or more loud speakers includes the first frequency band, modifying, via a filter and prior to transmission to the one or more loud speakers, the second acoustic signal to exclude only the first frequency band corresponding to the resonance frequency among the plurality of resonance frequencies for generating a modified second acoustic signal in a third frequency band, and outputting, to the one or more loudspeakers, the modified second acoustic signal in the third frequency band that excludes only the first frequency band corresponding to the resonance frequency among the plurality of resonance frequencies, the second frequency band being included in a second track of the musical piece, wherein the one or more loudspeakers convert electric signals into a sound, and the one or more actuators convert electric signals into a physical motion.

* * * * *